April 12, 1938. O. G. GOLDMAN 2,113,725
COATING BOND TESTING APPARATUS AND METHOD
Filed April 22, 1936

INVENTOR.
OSCAR G. GOLDMAN
BY *Miller Boyken &Bried*
ATTORNEY.

Patented Apr. 12, 1938

2,113,725

UNITED STATES PATENT OFFICE 2,113,725

COATING BOND TESTING APPARATUS AND METHOD

Oscar G. Goldman, San Francisco, Calif.

Application April 22, 1936, Serial No. 75,761

12 Claims. (Cl. 265—14)

This invention relates to methods and means for testing or determining the effectiveness of the bond between a protective coating material such as pitch, asphalt or other protective coating, applied to steel or other metal pipe, sheets, or other shapes.

The principal object of the invention is to provide a method and means for carrying out the above, and particularly for testing the strength of the bond between a sample of coal tar pitch and a steel pipe coated inside or outside therewith. Other objects and advantages of the invention will appear in the following description and accompanying drawing.

In the drawing Fig. 1 is a perspective view of my apparatus in position on the inside of a portion of a large pipe, ready for applying the test.

Figure 1:
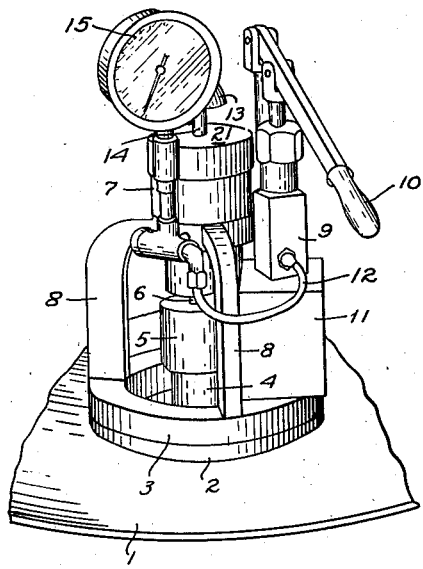

As a brief outline of the invention will make a detailed description of the drawing more easily understood, it may be stated to consist generally of means for applying a protective coating material such as hot pitch to an iron or steel surface, such as the inside or outside of a piece of pipe, and when cooled, exerting an upward pull against a unit area (say 1 square inch) of the material by means of an hydraulic jack, and increasing the pull until the coating is either torn from the metal or broken off above it. A pressure gage on the jack will indicate the pounds pressure per square inch required to strip the unit area of coating material or disrupt it. If the adherence of the coating material to the steel or iron pipe is greater than its own tensile strength, the latter must serve as the measure of its bond. To apply a unit area of the desired grade of pitch, a small tubular nipple or ferrule is used which has an internal area of 1 square inch at its lower end which is placed on the metal with which the bond is to be determined, then a quantity of molten pitch is poured into the nipple, permitted to set and cool, then the plunger of the hydraulic jack is connected to the upper end of the nipple and the force applied by the jack pump until the nipple is pulled off to either strip the coating from the steel or break it just within the nipple. The seating ends of the test nipples are made to fit either the inside or outside of pipes to be tested, or flat for sheet steel work, and loose interchangeable accommodating bases or rings are provided for the jack which are also shaped to fit the surface to which they are to be applied.

In the drawing, in Fig. 1, 1 is a portion of a large steel pipe within which the apparatus is positioned for the particular test to be made, 2 is the accommodating base ring shaped on its bottom to fit the inner curve of the pipe and on the flat upper face of the ring rests the base 3 of the apparatus. This base 3 is also a ring, and centered within the lower ring is the testing nipple or ferrule 4 which is threaded in its upper end and engaged by a threaded collar 5 revolvably mounted on the lower end of a piston rod 6 extending downward from a piston within a hydraulic jack (oil) cylinder 7 vertically supported on several legs or frame 8 preferably cast integral with the cylinder and with the base 3 of the apparatus.

At one side of the cylinder is a common form of plunger pressure pump 9 provided with an operating handle 10, and an oil reservoir 11 below from which oil is pumped into the lower end of the jack cylinder 7 through pipe 12 and runs back again when the pressure is released by letting go of the pump handle and pushing down on a knob 13 secured to the upper end of a rod 14 also secured with piston rod 6 to the jack piston, or in fact forming a reduced diameter extension of it as shown in detail in Fig. 2.

A pressure gage 15 suitably connected to the pressure side of the pump piping gives a reading of the upward pull developed in pounds.

Figure 2:
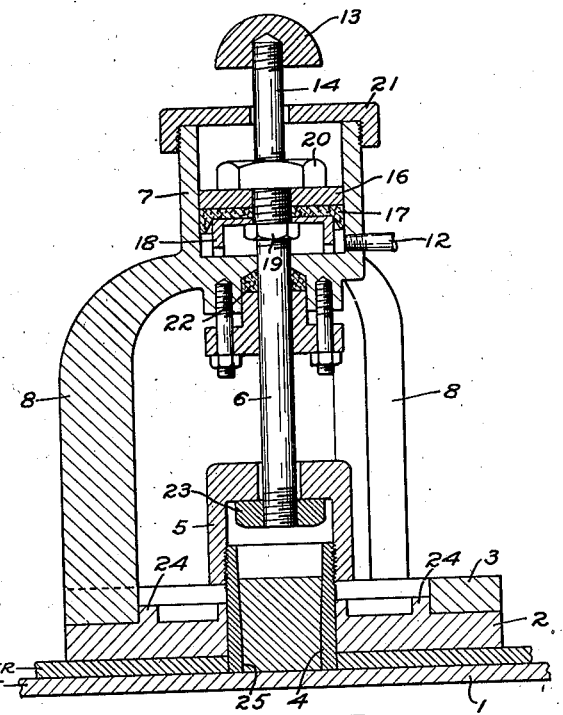
Fig. 2 is an enlarged vertical section through the hydraulic cylinder and testing nipple of the apparatus, with the apparatus in place on a layer of coating to be tested.

Fig. 2 shows the substantially conventional interior construction of the pressure or jack cylinder and wherein its piston is shown at 16 faced with a cup leather 17, an internal cupped stop washer 18 to protect the cup leather against striking at descent, and the threaded piston rod 6 passing through and clamped to the piston assembly by nuts 19, 20. The reduced upper portion 14 of the rod 6 passes loosely through a threaded cap 21 screwed over the outer end of the cylinder. The piston rod is sealed against leakage by a common stuffing box 22 at the lower end of the cylinder. A nut 23 at the lower end of the piston rod takes the strain of the test and supports threaded collar 5 so that it is free to revolve for screwing by hand to the upper end of the testing nipples.

Figure 3:
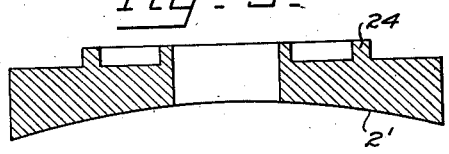
Fig. 3 is a cross section of an inwardly curved base plate used with the apparatus when testing the bond of a coating material on the outside of a pipe.
Figure 4:
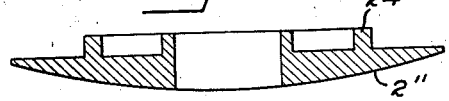
Fig. 4 is a cross section of an outwardly curved base plate used with the apparatus when testing the bond of a coating material on the inside of a pipe.
Figure 5:
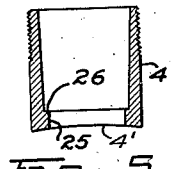
Figs. 5 and 6 are vertical cross sections of testing nipples respectively with inwardly and outwardly curved ends.
Figure 6:
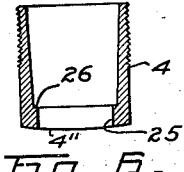

Fig. 2 shows the accommodating base 2 formed with a centering flange 24 to hold the base 3 concentric therewith and the nipple 4 centered under the piston rod for coupling to nut 5. The accommodating base 2 is shown with a flat undersurface so as to fit against a flat surface, but in Fig. 3 the base is shown with a lower surface 2' curved to fit upon the surface of a cylinder, such as a pipe, and in Fig. 4 the under-surface 2" is shown curved the reverse from that of Fig. 3 so as to fit against the inner curve of a cylinder or pipe, and as also shown in Fig. 1. These bases are interchangeable and will be made of various curves to meet the requirements of the tests to be made. The testing nipples 4 may also be flat at their lower ends or curved variously as shown at 4' and 4" in Figs. 5 and 6 respectively for the same purpose as explained for the bases 2.

Nipples 4, as stated, preferably have a bore 25 at the lower end of an an area equal to 1 square inch, though any other unit area may be used if desired. The bore of the nipple is tapered increasingly larger toward the upper end and preferably is formed with a shoulder 26 near the lower end so that there will be a greater cross section of the material within the nipple at all points above the extreme lower portion and hence confine any fracture in the testing to the lower end of the material within that portion of the bore having the desired unit area.

In making a bond test of a certain grade of pitch, first a suitable base ring 2 is placed on the sheet metal or pipe, a suitably formed nipple is dropped into its bore, and the nipple is poured about half or three-quarters full of hot molten pitch of the grade to be tested. This is permitted to cool so that the pitch is as hard as it will get, then the jack apparatus is placed upon the ring 2 as in Fig. 2, knob 13 is pushed down to force any oil in the cylinder back into the reservoir and bring collar or coupling 5 down on nipple 4. Collar 5 is then screwed to the nipple, and the pump handle is operated until the nipple is forcibly pulled from its position, either to pull off the patch of pitch from the steel, or break it within the small area of the nipple. The force to do this will, of course, be recorded on the gage dial and will indicate the bonding value of that particular sample. The most frequently used protective substances are coal tar pitch of about 4 to 10 penetration at 77° F., and similar grades of asphalt pitch, but the instrument may, of course, be used to test the bonding quality of any type of coating which will harden or set in the nipple.

Figures 7, 8:
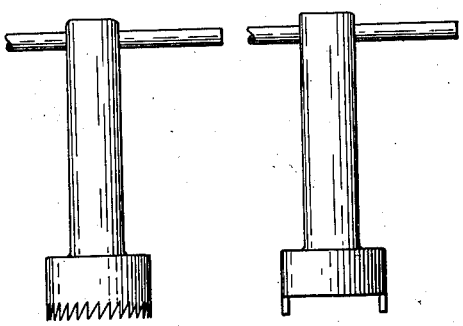
Fig. 7 is a side view of a hollow reamer used to prepare the location when testing existing coatings.
Fig. 8 is a modified reamer of the type shown in Fig. 5.

If it is desired to test the bonding quality of a pitch coating already in place on a sheet of steel, or on or in a pipe, I first cut a circular gap through the pitch layer with a reamer of the type shown in Fig. 7 and which cuts out a ring of pitch of a size for the nipple to fit into as shown in Fig. 2 wherein the pitch layer is so marked and the coated steel sheet is also indicated. A nipple 4 is dropped into the cut-out ring of pitch, some melted hot pitch is poured into the nipple to bond it to the disk of pitch at its bottom and, when cool, the test may be proceeded with as described.

In the modern coating of steel and iron pipe, the material generally used is a grade of coal tar pitch also called coal tar enamel, and as this material sometimes does not bond satisfactorily with the iron it is common to first apply a sub-stratum which aids in the bond. In such a case the test made with my apparatus registers the bond of whichever material gives way first.

Where a circular path is to be reamed from the inner or outer curved surface of a pipe already coated with pitch, it is evident that a flat-nosed reamer as in Fig. 7 would not cut to the metal, and hence a two-bladed reamer like that of Fig. 8 is used, and which will rise and fall to compensate for the curve of the pipe. In using either reamer, one of the base rings, 2, is first laid in place to serve as a guide through which the reamer is operated.

Figure 9:
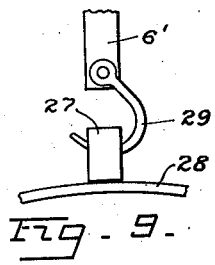
Figs. 9 and 10 show modifications in applying the bond test of a coating.
Figure 10:
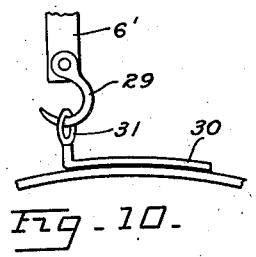

It is evident from the above description that other means might be used in place of the nipples for getting the upward pull on the coating, thus, for instance, a 1" area wooden plug 27 may be dipped into the molten pitch (or any varnish or paint) and at once applied to the iron 28, to be pulled up when hard set by using a hook 29 in the lower end of the jack piston rod 6' as shown in Fig. 9. Or a tape 1" wide may be dipped into the coating mixture and applied to the surface as at 30 and by means of a ring 31 or eyelet in the free end of the tape it may be pulled up with the apparatus to thereby indicate the pulling or tearing bond.

Other variations in the use of the apparatus will readily suggest themselves to one skilled in the art, as well as modifications in the construction of the apparatus, as the drawing is only intended to show one, though at present, preferred embodiment of the invention.

I therefore claim:

1. A protective metal coating bond testing apparatus comprising an hydraulic jack provided with recording pressure gage, a frame mounting said jack over an area to be tested, a piston rod extending downwardly from the cylinder of said jack and provided with means at its lower end for coupling to the work, and a base for said frame provided with an opening aligned with said piston rod for centering over said area.

2. A protective metal coating bond testing apparatus comprising an hydraulic jack provided with recording pressure gage, a frame mounting said jack over an area to be tested, a piston rod extending downwardly from the cylinder of said jack and provided with means at its lower end for coupling to the work, and a detachable base for said frame having a curved under-surface and provided with an opening aligned with said piston rod for centering over said area.

3. In a structure as specified in claim 1, a hollow nipple adapted to be centered in said opening and supported on said area to hold within it the coating to be tested and constitute the work for connecting to said piston rod.

4. An apparatus of the character described comprising an hydraulic jack, a frame upon which said jack is mounted, said frame provided with a base having a centering opening, a loose hollow nipple adapted to be centered in said opening, a piston rod from the jack cylinder extending downward, and means for connecting said piston rod to said nipple.

5. An apparatus of the character described comprising an hydraulic jack, a frame upon which said jack is mounted, said frame provided with a base having a centering opening, a loose hollow nipple adapted to be centered in said opening, a piston rod from the jack cylinder extending downward, means for connecting said piston rod to said nipple, and a continuation of said rod extending from the opposite end of the jack cylinder for manual return of the jack piston.

6. An apparatus of the character described comprising an hydraulic jack, a frame upon which said jack is mounted, said frame provided with a base having a centering opening, a loose hollow nipple adapted to be centered in said opening, a piston rod from the jack cylinder extending downward, means for connecting said piston rod to said nipple, said base being loose from said frame and provided with means for centering with respect thereto, and the base provided with a curved under-surface adapted to fit against the wall of a pipe.

7. An element in a protective coating bond testing apparatus comprising a tubular nipple provided at one end with coupling means, the bore of said nipple being smaller at the opposite end of the nipple.

8. An element in a protective coating bond testing apparatus comprising a tubular nipple provided at one end with coupling means, the bore of said nipple being smaller at the opposite end of the nipple from a point forming a definite shoulder adjacent the small end.

9. An element in a protective coating bond testing apparatus comprising a tubular nipple provided at one end with coupling means, the bore of said nipple being smaller at the opposite end of the nipple and said opposite end of the nipple formed to fit against the curved wall of a pipe.

10. A protective metal coating bond testing apparatus comprising a lifting jack provided with a work recording gage, a frame mounting said jack over an area to be tested, a pull rod extending downwardly from said jack and provided with means at its lower end for coupling to the work, and a base for said frame provided with an opening aligned with said pull rod for centering over said area, and a unit area coating connecting member adapted to be centered in said opening and arranged for connection to said pull rod.

11. Apparatus for testing the bond of adhesive protective metal coatings in place as on large steel pipes, plates and shapes, coated therewith, comprising an open ended ferrule of the desired transverse inside unit testing area at one end, said end of the ferrule adapted for cementing to said protective coating from within the ferrule only, a strain applying machine arranged to exert a pull in direction substantially at right angles away from the coated body, means connecting the opposite end of said ferrule to said machine, and a gage recording the force applied to said ferrule.

12. The method of testing the bonding qualities of adhesive protective coatings in place on metal surfaces such as of large pipes, plates and shapes, which comprises cutting a groove substantially through the coating of a size to include the desired unit area to be tested, applying an open ended ferrule into said groove and embracing said unit area of the coating, cementing the ferrule from within only to the coated unit area, applying an increasing pull on said ferrule in direction away from said coating, and recording the force exerted at the time of rupture.

OSCAR G. GOLDMAN.